(12) United States Patent
Caverly

(10) Patent No.: US 6,580,582 B1
(45) Date of Patent: Jun. 17, 2003

(54) CARTRIDGE MAGAZINE FOR A TAPE LIBRARY

(75) Inventor: Charles Caverly, Orange, CA (US)

(73) Assignee: Quantum Corporation, Milpitas, CA (US)

( * ) Notice: Subject to any disclaimer, the term of this patent is extended or adjusted under 35 U.S.C. 154(b) by 0 days.

(21) Appl. No.: 09/411,144

(22) Filed: Sep. 30, 1999

(51) Int. Cl.⁷ .............................................. G11B 15/68
(52) U.S. Cl. ..................................... 360/92; 369/30.42
(58) Field of Search ............................. 360/92, 98.04, 360/98.06; 369/34–38, 30.42, 30.48, 30.68, 30.69

(56) References Cited

U.S. PATENT DOCUMENTS

| | | | |
|---|---|---|---|
| 5,274,516 A | | 12/1993 | Kakuta et al. ................ 360/92 |
| 5,323,327 A | | 6/1994 | Carmichael et al. ......... 364/478 |
| 5,429,470 A | | 7/1995 | Nicol et al. .................. 414/331 |
| 5,532,931 A | | 7/1996 | Erickson, Jr. et al. .... 364/478.06 |
| 5,610,882 A | | 3/1997 | Dang ............................ 369/36 |
| 5,731,926 A | * | 3/1998 | Gallo et al. ..................... 360/92 |
| 5,761,161 A | * | 6/1998 | Gallo et al. ............... 369/30.48 |
| 5,781,367 A | * | 7/1998 | Searle et al. ................... 360/92 |
| 5,781,368 A | * | 7/1998 | Kotaki et al. .................. 360/92 |
| 5,856,894 A | * | 1/1999 | Marlowe ...................... 360/92 |
| 5,867,458 A | * | 2/1999 | Barkley et al. ................ 369/36 |
| 5,940,243 A | * | 8/1999 | Kanetsuku et al. ........... 360/92 |
| 6,005,744 A | * | 12/1999 | Terashima .................... 360/92 |
| 6,005,745 A | * | 12/1999 | Filkins et al. ................. 360/92 |
| 6,028,733 A | * | 2/2000 | Schmidtke et al. ........... 360/92 |
| 6,034,928 A | * | 3/2000 | Inoue ........................... 369/36 |
| 6,038,099 A | * | 3/2000 | Heinze et al. ................. 360/92 |
| 6,088,189 A | * | 7/2000 | Utsumi et al. ................ 360/92 |
| 6,104,564 A | * | 8/2000 | Shibuya et al. ............... 360/69 |
| 6,144,521 A | * | 11/2000 | Egan et al. .................... 360/92 |
| 6,154,337 A | * | 11/2000 | Hayashi et al. ............... 360/92 |
| 6,160,678 A | * | 12/2000 | Meikle et al. ................. 360/92 |
| 6,184,643 B1 | * | 2/2001 | Akiyama et al. ............ 318/566 |
| 6,271,983 B1 | * | 8/2001 | Carpenter et al. ............ 360/92 |
| 6,347,020 B1 | * | 2/2002 | Carpenter et al. ............ 360/92 |
| 6,480,443 B1 | * | 11/2002 | Foslien et al. ........... 369/30.42 |

FOREIGN PATENT DOCUMENTS

JP  5-325361  * 12/1993

OTHER PUBLICATIONS

Brochure for Power Stor L200 Automated DLT tape Library, ATL Products. This product is believed to have been on sale prior to the conception of the present invention.

Drawing of a load pack that is positioned within an interior of the Power Stor L200 Automated DLT tape Library.

* cited by examiner

Primary Examiner—Jefferson Evans
(74) Attorney, Agent, or Firm—James P. Broder; Steven G. Roeder (57) ABSTRACT

The present invention is directed to a tape library (10) and a cartridge magazine (22) for transferring cartridges (24) to and from a tape library (10), without interrupting the operation of the tape library (10). The cartridge magazine (22) is sized and shaped to selectively fit within a load port (20) of the tape library (10). Further, the cartridge magazine (22) selectively retains at least two cartridges (24) simultaneously. With this design, the cartridge magazine (22) allows for the bulk transfer of cartridges (24) into and out of a tape library (10) without interrupting the operation of the tape library (10). Further, the cartridge magazine (22) provides temporary or permanent storage of a set of cartridges (24) containing a particular data set.

69 Claims, 7 Drawing Sheets

CARTRIDGE MAGAZINE FOR A TAPE LIBRARY

FIELD OF THE INVENTION

The present invention relates generally to tape libraries. More specifically, the present invention relates to a removable cartridge magazine for inserting a plurality of cartridges into and/or removing a plurality of cartridges from a tape library.

BACKGROUND

Automated tape libraries are used for storing and retrieving relatively large amounts of information in digital form. One type of tape library includes a library housing, a plurality of cartridges retained in a plurality of storage bins within the library housing, a robotic cartridge handling mechanism and one or more tape drives. The robotic cartridge handling mechanism is used to individually retrieve one of the cartridges from one of the storage bins and place the cartridge within one of the tape drives.

Unfortunately, existing tape libraries are not completely satisfactory. In particular, the operation of some tape libraries must be interrupted to insert or remove cartridges from the tape library. One solution to this problem involves the use of a load port which extends through the library housing. The load port allows for the insertion or removal of cartridges without interrupting the operation of the tape library. Some existing load ports are designed of use with individual cartridges. In large tape libraries, it is often necessary to insert or remove a plurality of cartridges from the library housing. With existing load ports, the process of inserting or removing a plurality of cartridges without interrupting the operation of the tape library is time consuming and inconvenient.

In light of the above, it is an object of the present invention to provide a device which allows for the bulk transfer of cartridges into and out of a tape library without interrupting the operation of the tape library. Another object of the present invention is to provide a device which allows for the temporary or permanent storage of a set of cartridges containing a particular data set. Yet another object of the present invention is to provide a tape library having improved durability, which is relatively easy and cost efficient to manufacture and utilize.

SUMMARY

The present invention is directed to a cartridge magazine and a tape library which satisfies these needs. The cartridge magazine facilitates the bulk transfer of a plurality of cartridges to and from the tape library. As provided herein, the cartridge magazine is sized and shaped to selectively fit within a load port of the tape library. Further, the cartridge magazine selectively retains at least two cartridges simultaneously. With this design, the cartridge magazine can be used for the bulk transfer of cartridges into and out of a tape library without interrupting the operation of the tape library. Further, the cartridge magazine provides temporary or permanent storage for a set of cartridges containing a particular data set.

The cartridge magazine includes a magazine body having at least two cartridge slots. Each cartridge slot receives one of the cartridges. Preferably, the cartridge magazine selectively retains more than two cartridges simultaneously. In particular, the cartridge magazine can be designed to receive six cartridges. Additionally, the cartridge magazine can include a cartridge latch for selectively securing the cartridges in the magazine. The cartridge latch insures that the cartridges are securely retained in the cartridge magazine until the cartridges are to be removed from the cartridge magazine.

The load port extends through a library housing of the tape library and provides access to a library cavity of the tape library. As provided herein, the load port can be designed to receive multiple cartridge magazines simultaneously. Further, as provided herein, the load port can include a frame assembly and a cylinder assembly which retains the cartridge magazine. Importantly, the cylinder assembly and the cartridge magazine selectively move relative to the frame assembly. In particular, the cylinder assembly and cartridge magazine slide relative to the frame assembly. Further, a portion of the cylinder assembly and the cartridge magazine rotate relative to the frame assembly. This feature allows the cartridges to be properly positioned for removal within the library cavity.

Additionally, the tape library includes a cartridge handling mechanism positioned within the library cavity of the tape library. The cartridge handling mechanism moves each cartridge from the cartridge magazine into the library cavity. Further, the cartridge handling mechanism preferably moves the cartridge latch from an engaged position to a disengaged position. This feature allows the cartridge handling mechanism to release each cartridge from the cartridge magazine and individually grasp each of the cartridges in the cartridge magazine.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
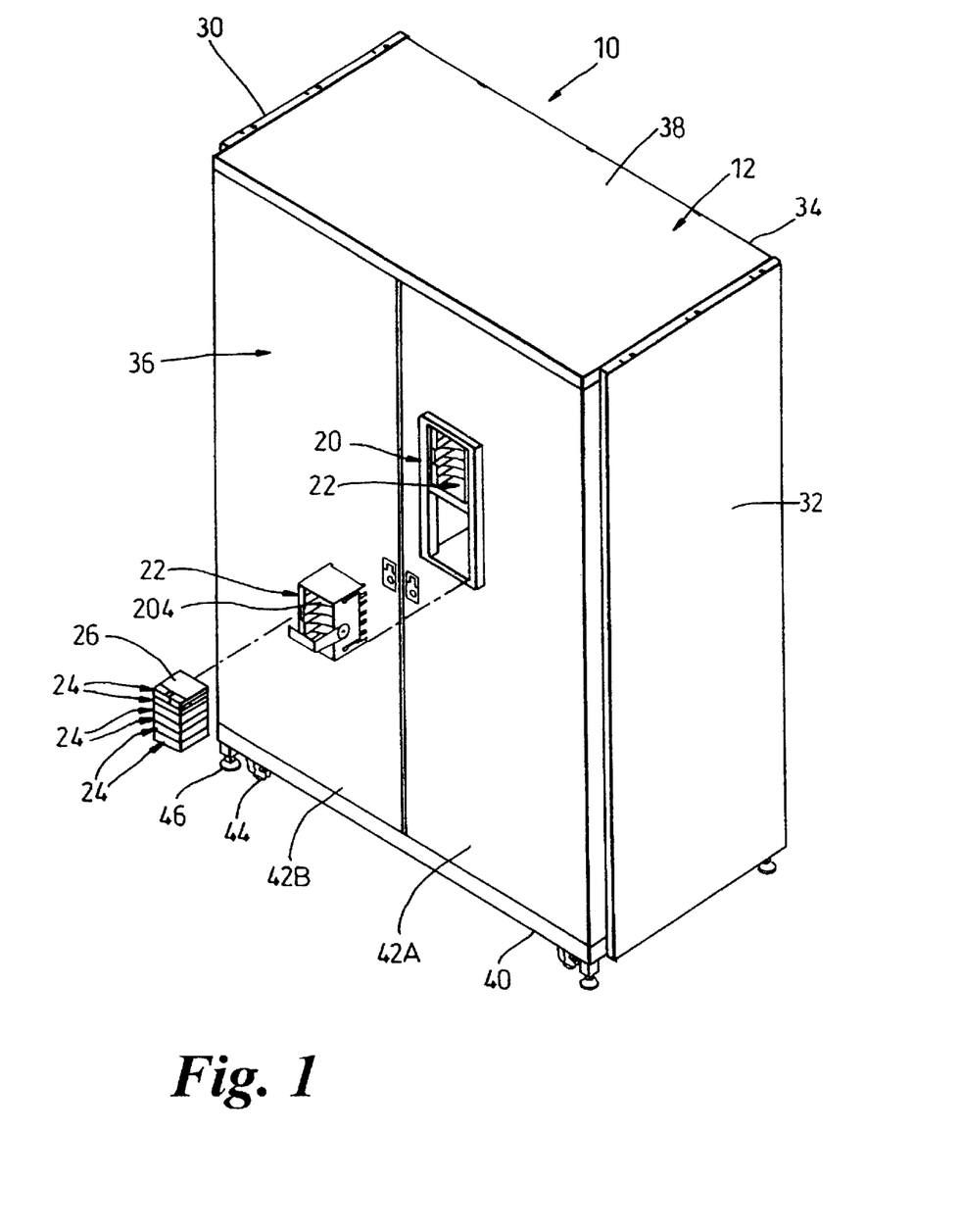
FIG. 1 is a partially exploded, perspective view of a tape library having features of the present invention.
Figure 2:
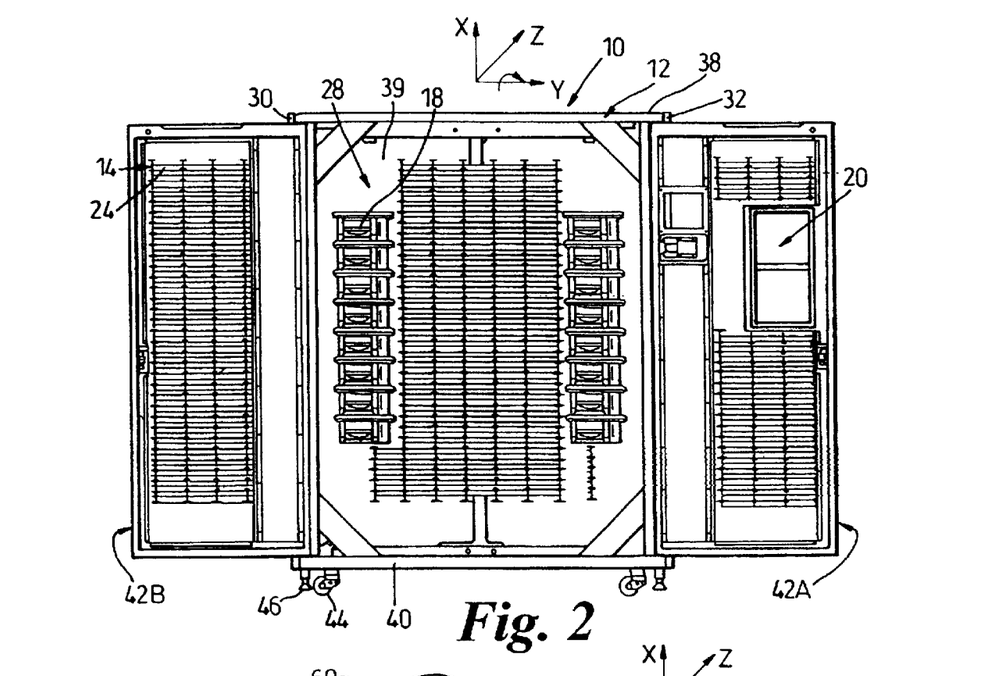
FIG. 2 is a front plan view of the tape library of FIG. 1, with a pair of doors in an open position; a cartridge handling mechanism and a cartridge magazine are not illustrated in FIG. 2 for clarity.
Figure 3:
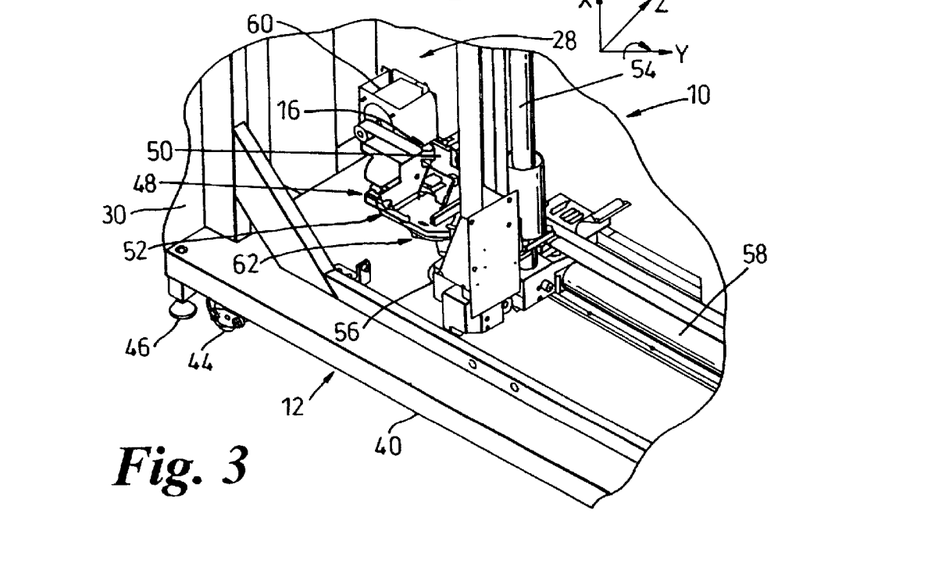
FIG. 3 is partial perspective view of a tape library and a cartridge handling mechanism having features of the present invention.

Referring initially to FIGS. 1–3, a tape library 10 having features of the present invention includes a library housing 12, one or more storage bins 14, one or more cartridge handling mechanisms 16, one or more cartridge readers 18, a load port 20 and one or more cartridge magazines 22. As provided in detail below, each cartridge magazine 22 selectively inserts into the load port 20 and allows for the bulk transfer of a plurality of cartridges 24 into and out of the tape library 10 without interrupting the operation of the tape library 10.

A representative tape library, without the load port 20 and the cartridge magazines 22 provided herein, is sold by Quantum Corporation, the Assignee of the present invention under the trademark DLT™. Accordingly, only the structural aspects of the tape library 10 which are particularly significant to the present invention are provided herein.

The number of cartridges 24 and the configuration of the cartridges 24 can be varied to suit the design requirements of the tape library 10. Each cartridge 24 typically includes a storage medium (not shown) which stores data in a form that can be subsequently retrieved if necessary. A magnetic storage tape is commonly used in the cartridges 24 to store data in digital form. In the embodiment illustrated in FIG. 1, each cartridge 24 includes a substantially rectangular cartridge housing 26 which encloses the storage medium. A suitable cartridge 24 is sold under the trademark DLT™ by Quantum Corporation.

The library housing 12 retains the various components of the tape library 10. The design of the library housing 12 can be varied to suit the design requirements of the tape library 10. The library housing 12 illustrated in the FIGS. 1 and 2 is substantially rectangular shaped and defines a substantially rectangular shaped library cavity 28. The library housing 12 includes (i) a planar, housing first side 30, (ii) a planar, housing second side 32 substantially opposite the housing first side 30, (iii) a planar, housing back side 34 which extends between the housing first side 30 and the housing second side 32, (iv) a housing front side 36 which is substantially parallel with the housing back side 34, (v) a planar, housing top 38 and (vi) a planar, housing bottom 40.

As illustrated in FIGS. 1 and 2, the housing front side 36 can include a right door 42A and a left door 42B which pivot open and allow for access into the library cavity 28. Additionally, the library housing 12 illustrated in FIGS. 1 and 2 includes a plurality of spaced apart casters 44 and a plurality of spaced apart stands 46 which are secured to the housing bottom 40. The casters 44 allow the tape library 10 to be easily moved, while the stands 46 can be adjusted to lift the casters 44 away from the ground (not shown) for permanent placement of the tape library 10.

The storage bins 14 retain the cartridges 24 within the tape library 10. The design, location and number of storage bins 14 varies according to the design of the cartridges 24 and the tape library 10. Typically, each storage bin 14 is a rectangular shaped slot which is sized and shaped to retain a single cartridge 24. In the embodiment illustrated in the FIG. 2, one hundred and seventy storage bins 14 are secured to the housing back side 34, ninety-six storage bins 14 are secured to the left door 42B and sixty storage bins 14 are secured to the right door 42A.

The cartridge readers 18 transfer information to and from the cartridges 24. The design, location and the number of cartridge readers 18 can be varied to suit the requirements of the tape library 10. For the embodiments provided herein, a suitable cartridge reader 18 is a tape drive sold under the trademark DLT™, by Quantum Corporation. In the embodiment illustrated in FIG. 2, sixteen cartridge readers 18 are secured to the housing back side 34. Alternately, for example, the tape library 10 can include more than sixteen or less than sixteen cartridge readers 18.

The cartridge handling mechanism 16 selectively moves and positions the cartridges 24 within the library cavity 28. More specifically, the cartridge handling mechanism 16 is adapted to retrieve any one of the cartridges 24 from any of the storage bins 14 and transfer the cartridge 24 to any one of the cartridge readers 18, another one of the storage bins 14 or one of the cartridge magazines 22 in the load port 20. Further, the cartridge handling mechanism 16 can individually move each cartridge 24 from the cartridge magazines 22 in the load port 20 to one of the storage bins 14 or one of the cartridge readers 18.

FIG. 3 illustrates a portion of cartridge handling mechanism 16 which can be used to move the cartridges 24 within the library cavity 28. The cartridge handling mechanism 16 includes a handler mover 48, a gripper assembly 50 and an extension access assembly 52. The handler mover 48 moves the gripper assembly 50 relative to the storage bins 14, the cartridge readers 18, and the load port 20. Preferably, the handler mover 48 moves the gripper assembly 50 along an X axis, a Y axis, and around the Y axis so that the gripper assembly 50 can move and position the cartridges 24 within the library cavity 28. Referring to FIG. 3, the handler mover 48 can include (i) a pair of spaced apart vertical guides 54 (only one is illustrated), (ii) a vertical actuator 56 for moving the gripper assembly 50 vertically along the vertical guides 54, (iii) a pair of spaced apart horizontal guides 58 (only one is illustrated), (iv) a horizontal actuator 60 which moves the gripper assembly 50 horizontally along the horizontal guides 58, and (v) a rotary actuator 62 which rotates the gripper assembly 50 around the Z axis. Rotation around the Y axis allows the gripper assembly 50 to transfer the cartridges 24 between (i) the storage bins 14 in the doors 42A, 42B, or the cartridge magazines 22 in the right door 42A and the (ii) storage bins 14 on the housing back side 34 or the cartridge readers 18.

The gripper assembly 50 grips the individual cartridges 24 and allows for the transfer of the cartridges 24 within the library cavity 28. The gripper assembly 50 can be designed in many ways. For example, the gripper assembly 50 can include a lower jaw and an upper jaw which is moved relative to the lower jaw by a gripper motor (not shown) to selectively grasp a cartridge 24. The extension access assembly 52 includes an actuator or motor which moves the gripper assembly 50 along the Z axis. Functionally, the extension access assembly 52 extends the gripper assembly 50 forward to make contact with the desired cartridge 24 and subsequently retracts the gripper assembly 50 to remove the cartridge 24 for the storage bin 14, the cartridge reader 18 or the cartridge magazine 22. The extension access assembly 52 also allows the cartridge handling mechanism 16 to release the cartridge 24 from each cartridge magazine 22 as provided below.

The cartridge handling mechanism 16 can include a bar code scanner (not shown) that reads a bar code label (not shown) on the cartridges (24). The scanner preferably maintains an inventory of the cartridges 24 in the tape library 10.

The load port 20 allows access to the library cavity 28 during operation of the tape library 10. More specifically, the load port 20 allows for the transfer of cartridges 24 from the library cavity 28 to outside the tape library 10 and/or allows for the transfer of cartridges 24 into the library cavity 28. The location of the load port 20 can be varied. Further, the tape library 10 can include multiple load ports 20. In the embodiment illustrated in the Figures, the load port 20 extends through the right door 42A. Alternately, for example, the load port could extend thought the left door 42B, or the housing back side 34.

Figure 4:
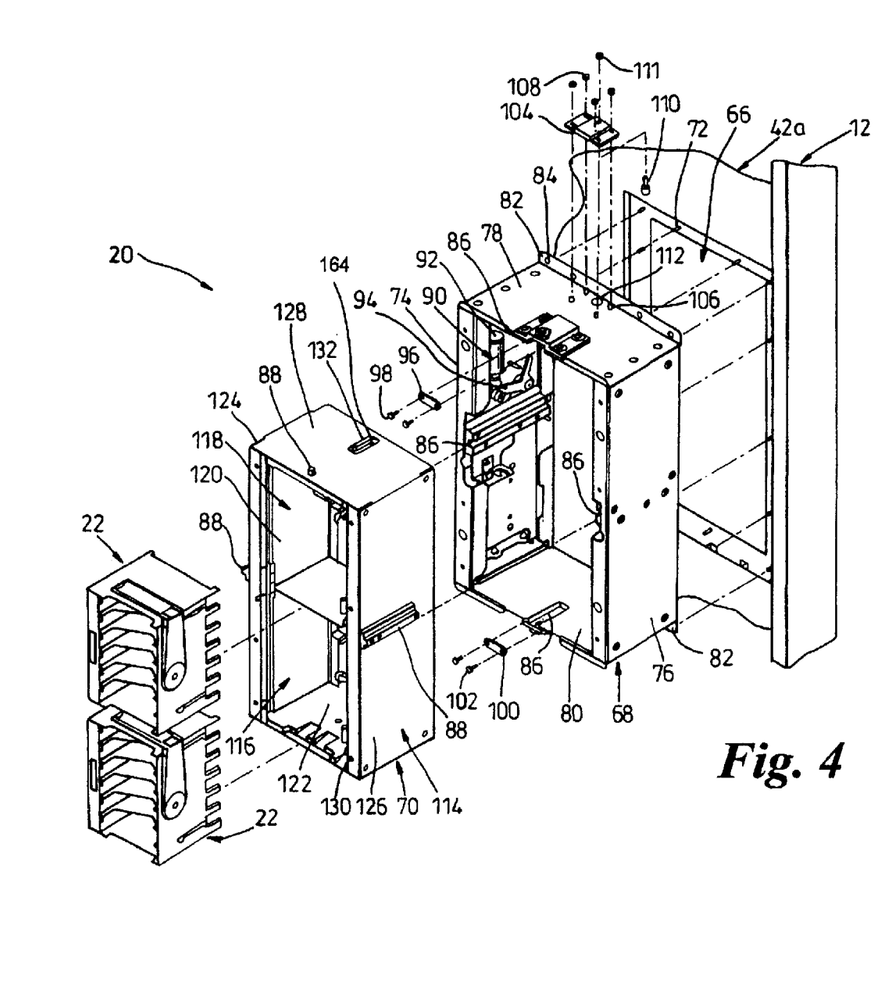
FIG. 4 is a partly exploded, perspective view of a load port, a pair of cartridge magazines and a portion of a library housing having features of the present invention.

Further, the design of the load port 20 can be varied to suit the requirements of the cartridge magazine 22. FIG. 4 illustrates an exploded perspective view of a load port 20, a portion of the library housing 12 and a pair of cartridge magazines 22 having features of the present invention. In the embodiment illustrated in the FIG. 4, the load port 20 includes a library opening 66, a frame assembly 68 and a cylinder assembly 70. As can best be seen with reference to FIG. 4, the library opening 66 is generally rectangular shaped and extends through the right door 42A. A plurality of spaced housing bolts 72 extend away from the right door 42A near the library opening 66 for securing the frame assembly 68 to the right door 42A.

The frame assembly 68 is generally rectangular shaped and includes (i) a first frame side 74, (ii) a second frame side 76 substantially opposite the first frame side 74, (iii) a frame top 78 and (iv) a frame bottom 80. The frame top 78 and the frame bottom 80 each include a flange 82 which projects outwardly. Each flange 82 includes a plurality of spaced apart flange holes 84 for receiving the housing bolts 72. A plurality of housing nuts (not shown) engage the housing bolts 72 and secure the frame assembly 68 to the right door 42. It should be noted in FIG. 4 that the frame assembly 68 is secured to the inner side of the right door 42A. As a result thereof, the frame assembly 68 is positioned in the library cavity 28 when the doors 42A, 42B are closed.

In the embodiment illustrated in FIG. 4, each of the frame sides 74, 76, the frame top 78 and the frame bottom 80 of the frame assembly 68 includes a frame channel 86. Each frame channel 86 interacts with a corresponding cylinder projection 88 on the cylinder assembly 70. This allows the cylinder assembly 70 to slide relative to the frame assembly 68. This also allows each cartridge magazine 22 in the cylinder assembly 70 to slide outwardly from the library cavity 28. This provides additional space for each cartridge magazine 22 to be rotated in the cylinder assembly 70 as provided below. This also provides additional space for the cartridge handling mechanism 16 to move in the library cavity 28 near the load port 20.

Additionally, the frame assembly 68 can include a locking mechanism 90 which selectively inhibits the cylinder assembly 70 from sliding relative to the frame assembly 68. Referring to FIG. 4, the locking mechanism 90 can include a solenoid 92 and a cylinder assembly latch 94 which is pivotably secured to the first frame side 74 of the frame assembly 68. The solenoid 92 selectively moves the cylinder assembly latch 94 to selectively inhibit the cylinder assembly 70 from sliding within the frame assembly 68.

The frame assembly 68 illustrated in FIG. 4 also includes an upper front plate 96 which is secured to the frame top 78 with top bolts 98 and a bottom front plate 100 which is secured to the frame bottom 80 with bottom bolts 102. The upper front plate 96 and the bottom front plate 100 secure the cylinder assembly 70 within the frame assembly 68. Moreover, the frame assembly 68 includes a top plate 104 which is secured to the frame top 78 with a plurality of spaced apart plate bolts 106 and plate nuts 108. A downward guide projection 110, i.e. a bolt, is secured to the top plate 104 with a nut 111. The guide projection 110 extends through an upper aperture 112 in the frame top 78. When assembled, the downward guide projection 110 extends below the frame top 78 of the frame assembly 68 and is used to guide the rotation of a portion of the cylinder assembly 70 as provided below.

The cylinder assembly 70 fits within the frame assembly 68 and selectively slides relative to the frame assembly 68. In the embodiments provided herein, the cylinder assembly 70 includes (i) an outer assembly 114 and (ii) an inner assembly 116 which selectively rotates relative to the outer assembly 114 and the frame assembly 68. Stated another way, a portion of the cylinder assembly 70 rotates relative to the frame assembly 68. This feature allows the cartridges 24 in the cartridge magazine 22 to be rotated in the load port 20 so that the cartridges 24 are properly oriented for gripping with the cartridge handling mechanism 16.

Further, the cylinder assembly 70 includes at least one magazine port 118 for receiving a cartridge magazine 22. In the embodiment illustrated in the Figures, the cylinder assembly 70 includes an upper magazine port 120 and a lower magazine port 122. Alternately, for example, the cylinder assembly 70 could include three or more magazine ports. Each magazine port 118 is sized and shaped to receive one the cartridge magazines 22. In the embodiments provided herein, each magazine port 118 is generally rectangular shaped.

Figure 5:
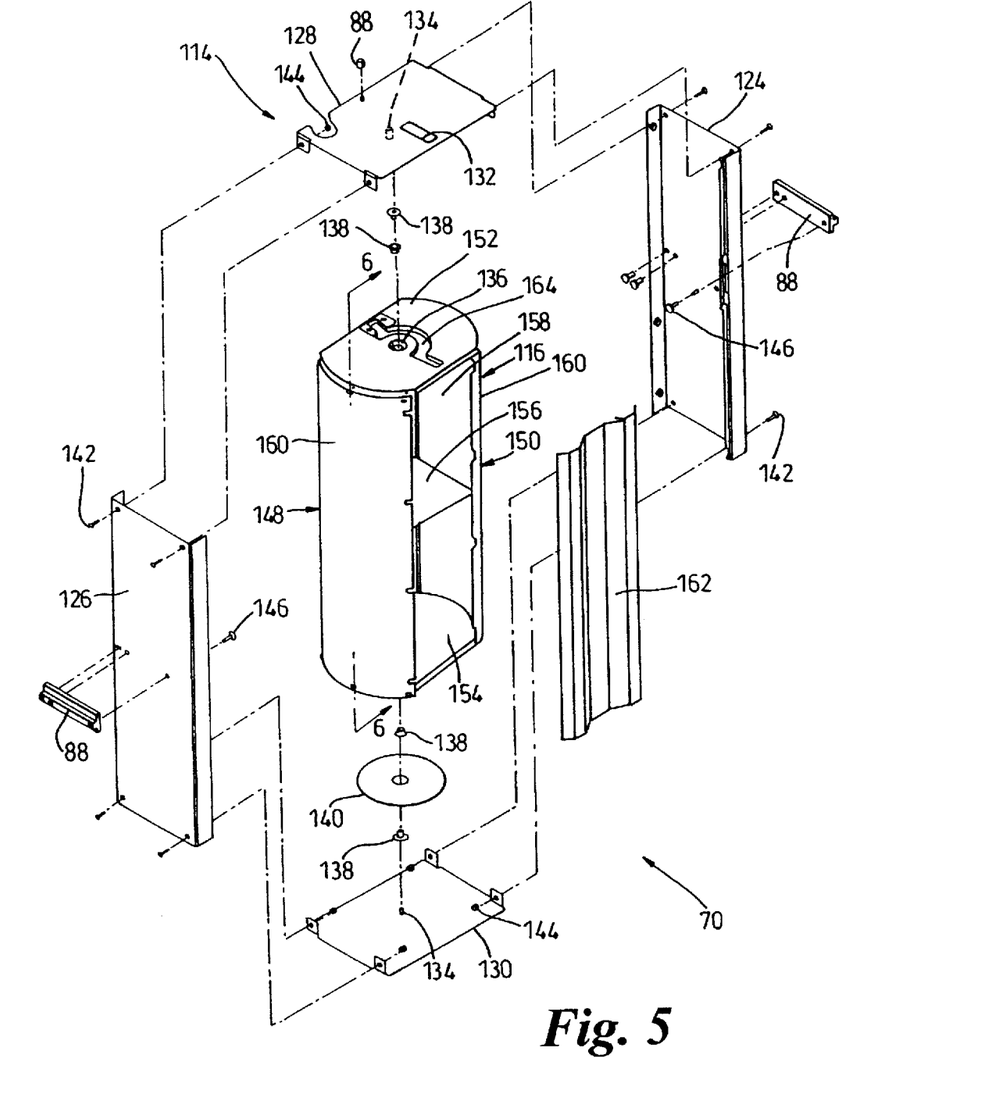
FIG. 5 is a partly exploded, perspective view of a cartridge assembly having features of the present invention.

Referring to FIGS. 4 and 5, the outer assembly 114 is generally rectangular shaped and includes (i) an outer first side 124, (ii) an outer second side 126 substantially opposite the outer first side 124, (iii) an outer top 128 and (iv) an outer bottom 130. (The cylinder projection which extends from the outer bottom 130 is not shown) The cylinder projections 88 extend outwardly from the outer first side 124, the outer second side 126, the outer top 128 and the outer bottom 130. The cylinder projections 88 interact with the frame channels 86 of the frame assembly 68 to guide the sliding of the cylinder assembly 70 within the frame assembly 68.

The outer top 128 also includes a slot 132 which allows the outer assembly 114 to slide relative to the guide projection 110 which extends downward from the frame assembly 68. Referring to FIG. 5, the outer top 128 and the outer bottom 130 each include a pin 134 (the pin 134 for the outer top 128 is illustrated in phantom) which extends inwardly towards the inner assembly 116. The pins 134 interact with a pair of cylinder apertures 136 (only one is illustrated) in the inner assembly 116 and allow the inner assembly 116 to rotate relative to the outer assembly 114. Bushings 138 and a friction pad 140 can be positioned between the outer top 128, the inner assembly 116 and the outer bottom 130 as illustrated in FIG. 5. Additionally, as illustrated in FIG. 5, the outer sides 124, 126 can be secured to the outer top 128 and the outer bottom 130 with bolts 142 and nuts 144. Further, two of the cylinder projections 88 can be secured to the outer sides 124, 126 with projection bolts 146.

Figure 6:
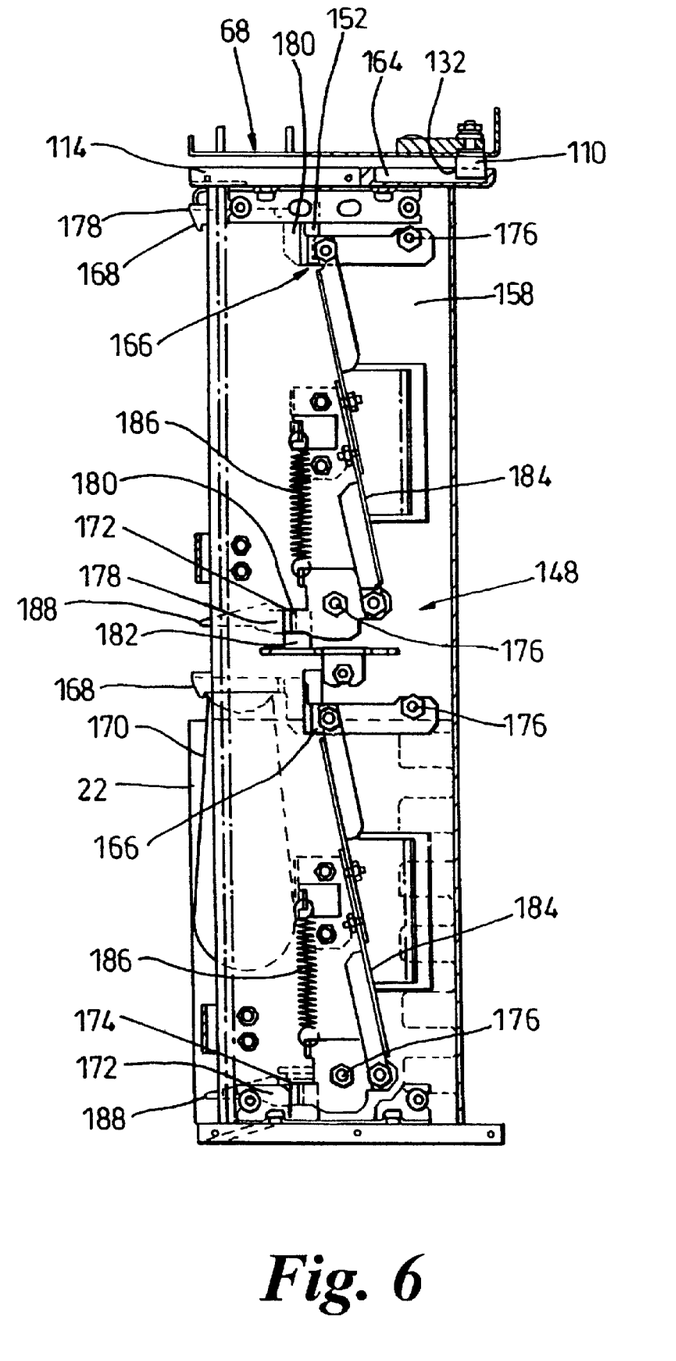
FIG. 6 is a cut-away view taken on line 6—6 in FIG. 5, a portion of a frame assembly and a cartridge magazine are also illustrated in FIG. 6.

Referring to FIGS. 5 and 6, the inner assembly 116 includes (i) a first double wall side 148, (ii) a second double wall side 150 which is substantially parallel with the first double wall side 148, (iii) a top 152 which extends between the double wall sides 148, 150, (iv) a bottom 154 spaced apart from the top 152 and extending between the double wall sides 148, 150, and (v) an intermediate divider 156 extending between the double wall sides 148, 150 intermediate the top 152 and the bottom 154. Each double wall side 148, 150 includes a planar, interior wall 158 and an arc shaped outer wall 160. Each interior wall 158 cooperates with the top 152, the bottom 154 and the intermediate divider 156 to define the upper magazine port 120 and the lower magazine port 122. As illustrated in FIG. 5, the inner assembly 116 can also include a back wall 162 which is secured to the double wall sides 148, 150 substantially opposite the magazine ports 118.

The top 152 and the bottom 154 of the inner assembly 116 each include one of the cylinder apertures 136 (only the cylinder aperture 136 in the top 152 is illustrated). As provided above, each cylinder aperture 136 receives one of the pins 134 and allows the inner assembly 116 to rotate relative to the outer assembly 114. Additionally, an upper surface of the top 152 includes a somewhat "u" shaped guide channel 164. As can best be seen with reference to FIG. 6, the guide projection 110 of the frame assembly 68 extends through the slot 132 in the outer assembly 114 into the guide channel 164 of the inner assembly 116. With this configuration, the guide projection 110 interacts with the guide channel 164 and limits the rotation of the inner assembly 116 relative to the frame assembly 68. More specifically, the shape of the guide channel 164 limits the rotation of the inner assembly 116 relative to the frame assembly 68 and the outer assembly 114 to 180 degrees. This feature limits rotation of each cartridge magazine 22 to 180 degrees. Further, the shape of the guide channel 164 only allows the inner assembly 116 to rotate relative to the frame assembly 68 when the cylinder assembly 70 is slid outwardly in the frame assembly 68 away from the cartridge handling mechanism 16. Thus, rotation of each cartridge magazine 22 can only occur after each cartridge magazine 22 is retracted a safe distance away from the cartridge handling mechanism 16.

The inner assembly 116 can include a magazine latch 166 for selectively latching or locking each cartridge magazine 22 in one of the magazine ports 118. In the embodiment illustrated in FIG. 6, the inner assembly 116 includes a separate magazine latch 166 for each cartridge magazine 22. The magazine latch 166 can be implemented in a number of alternate ways. For example, in the embodiment illustrated in FIG. 6, each magazine latch 166 includes an upper catch 168 which engages a handle 170 of the cartridge magazine 22 and a lower catch 172 which engages a side projection 174 of the cartridge magazine 22. In this embodiment, each catch 168, 172 (i) includes a pivot end 176 which is secured to the interior wall 158 within the first double wall side 148, (ii) a distal end 178 which engages the cartridge magazine 22, and (iii) an offset intermediate section 180. The pivot end 176 of each catch 168, 172 allows each catch 168, 172 to pivot relative to the magazine ports 118. The offset intermediate section 180 of each catch 168, 172 extends through a wall aperture 182 in the interior wall 150 of the first double wall side 148 and allows the distal end 178 of each catch 168, 172 to be positioned within the magazine port 118 for engagement with the cartridge magazine 22.

The catches 168, 172 are secured together with a connector beam 184 so that movement of the lower catch 172 results in movement of the upper catch 168. A return 186, i.e. a spring, extends between the interior wall 158 of the first double wall side 148 and the lower catch 172 to urge the catches 168, 172 to engage the cartridge magazine 22. The lower catch 172 also includes a latch handle 188 which projects from the magazine port 118. The latch handle 188 enables an operator (not shown) to selectively move the magazine latch 166 between (i) an engaged position in which the catches 168, 172 engage the cartridge magazine 22 and retain the cartridge magazine 22 in the magazine port 118 and (ii) a disengaged position in which the cartridge magazine 22 can be removed from the magazine port 118.

The cartridge magazine 22 selectively fits within the load port 20 and retains at least two cartridges 24 simultaneously. The design of the cartridge magazine 22 can be varied according to the design of the cartridges 24 and the load port 20. Further, the cartridge magazine 22 can be designed to selectively retain more than two cartridges 24. Preferably, each cartridge magazine 22 is designed to retain more than four cartridges 24. For example, the cartridge magazines 22 illustrated in the Figures are designed to selectively retain six cartridges 24 simultaneously. With this design, the cartridge magazine 22 can be used for the bulk transfer of cartridges 24 into and out of a tape library 10 without interrupting the operation of the tape library 10. Further, the cartridge magazine 22 provides temporary or permanent storage for a set of cartridges 24 containing a particular data set. Alternately, for example, each cartridge magazine 22 could retain eight cartridges.

Figures 7, 8, 9:
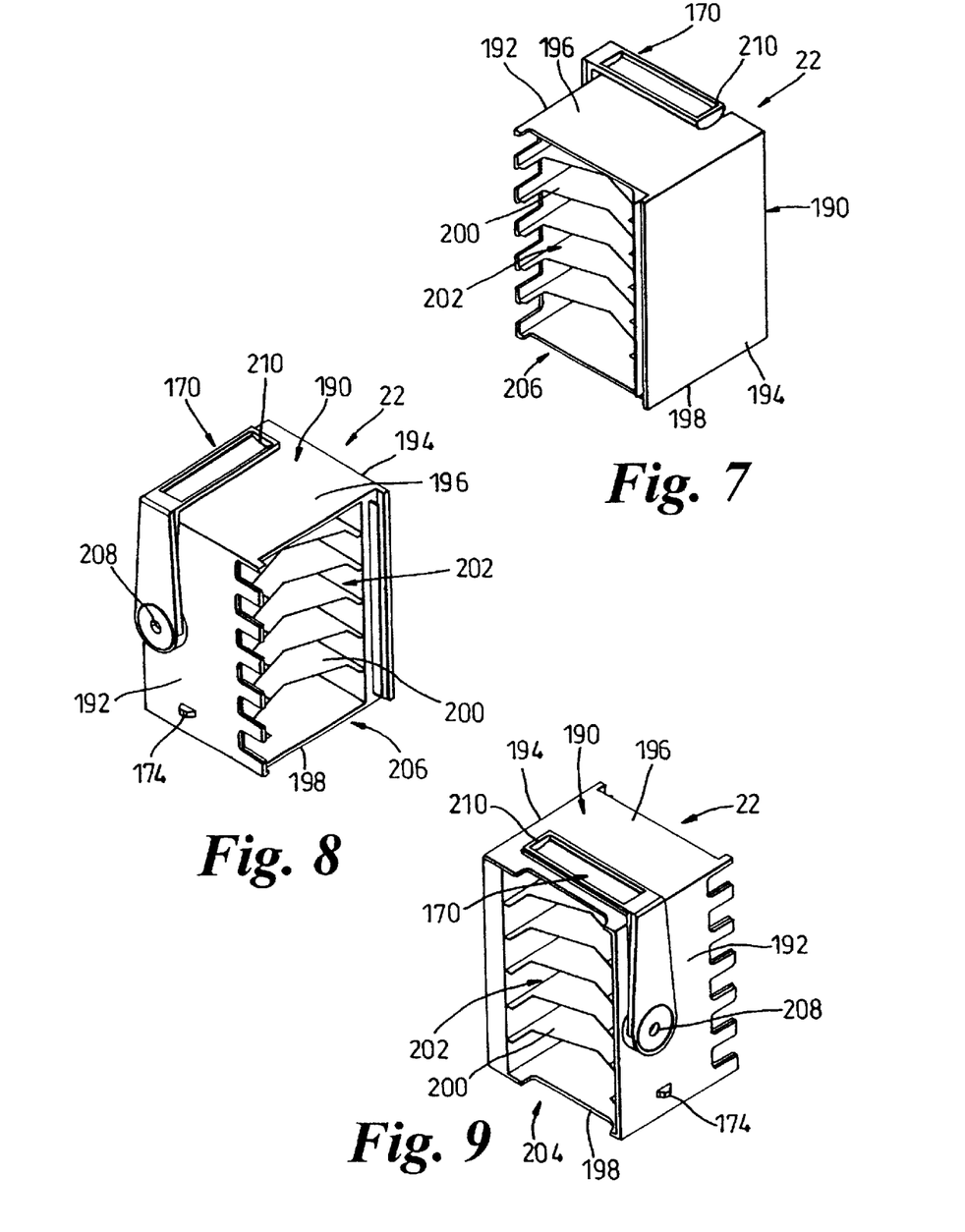
FIG. 7 is a rear perspective view of a cartridge magazine having features of the present invention.
FIG. 8 is another rear perspective view of the cartridge magazine of FIG. 7.
FIG. 9 is a front perspective view of the cartridge magazine of FIG. 7.

FIGS. 7–9 illustrate perspective views of a cartridge magazine 22 having features of the present invention. In particular, the cartridge magazine 22 illustrated in the FIGS. 7–9 includes a rectangular shaped cartridge body 190 including (i) a planar, magazine first side 192, (ii) a magazine second side 194 which is substantially parallel with the magazine first side 192, (iii) a planar, magazine top 196 which extends between the magazine sides 192, 194, (iv) a planar, magazine bottom 198 which extends between the magazine sides 192, 194 spaced apart from the magazine top 196, and (v) five, spaced apart, planar shaped dividers 200 which extend between the magazine sides 192, 194 in between the magazine top 196 and the magazine bottom 198. The dividers 200 define a plurality of rectangular shaped, cartridge slots 202, each of which is sized and shaped to receive an individual cartridge 24. Each cartridge magazine 22 also includes an open front 204 and an open back 206. The cartridges 24 are inserted into the open front 204.

The magazine handle 170 is "L" shaped and interacts with the upper catch 168. The magazine handle 170 includes a pivot end 208 which is secured to and pivots relative to the magazine first side 192 and a distal end 210 which cantilevers above the magazine top 196. Further, the side projection 174 projects from the magazine first side 192. The side projection 174 interacts with the lower catch 172 as provided above.

Figure 10:
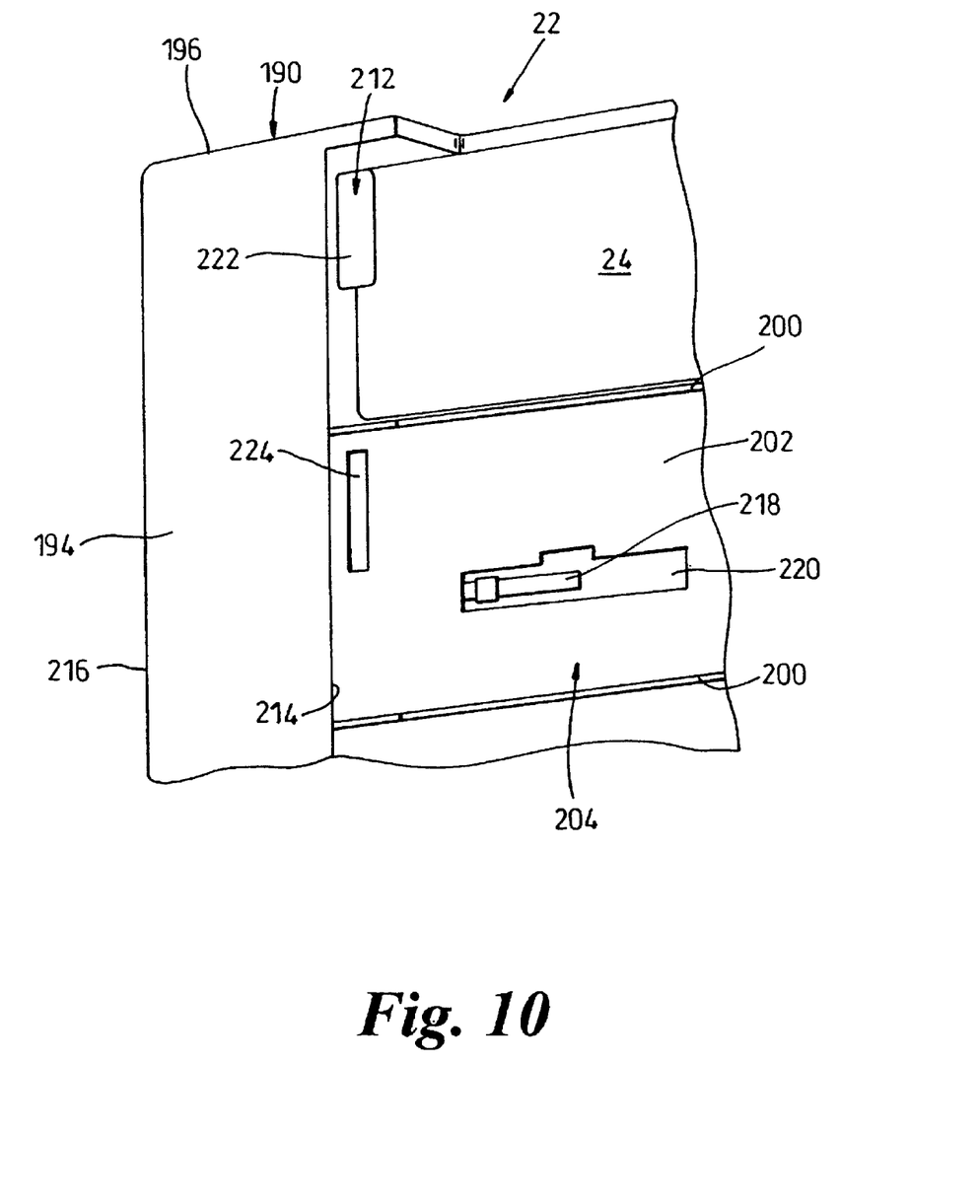
FIG. 10 is a perspective view of a portion of the cartridge magazine of FIG. 7.

Referring to FIG. 10, each cartridge magazine 22 preferably includes a cartridge latch 212 for selectively retaining the cartridges 24 within the cartridge magazine 22. More specifically, the cartridge magazine 22 preferably includes a separate cartridge latch 212 for each cartridge slot 202 to individually retain each cartridge 24 in the cartridge magazine 22. This feature allows each cartridge 24 to be individually removed without influencing the other cartridges 24 in the cartridge magazine 22.

The design of the cartridge latch 212 can be varied to suit the design requirements of the tape library 10. FIG. 10 illustrates one embodiment of a cartridge latch 212. More specifically, FIG. 10 illustrates a perspective view of a portion of the cartridge magazine 22 with a cartridge 24 in one of the cartridge slots 202 and another cartridge slot 202 unoccupied. In the embodiment illustrated in FIG. 10, each cartridge latch 212 is a push—push type latch which is somewhat similar to that used in a common ink pin. More specifically, the magazine second side 194 is double walled and includes an inner wall 214 and an outer wall 216. In this embodiment, a sliding projection 218 extends from the magazine second side 194 through a projection channel 220 in the inner wall 214 into one of the cartridge slots 202. The sliding projection 218 is adapted to slide in the projection channel 220 relative to the inner wall 214. A spring return (not shown) biases the sliding projection 218 towards the open front 204 of the cartridge magazine 22. The sliding projection 218 is coupled to a moving stop 222 which selectively projects from the magazine second side 194 near the open front 204 through a stop aperture 224 in the inner wall 214 into one of the cartridge slots 202.

With this type of latch 212, as the cartridge 24 is inserted into one of the cartridge slots 202, the side of the cartridge 24 engages the sliding projection 218. Thus, inserting the cartridge 24 causes the sliding projection 218 to slide in the projection channel 202 away from the open front 204. The latch 212 is designed so that when the cartridge 24 is fully inserted into the cartridge slot 202, the sliding projection 218 will have moved the moving stop 222 from within the magazine second side 194 through the stop aperture 224 into the cartridge slot 202. In this position, the moving stop 222 engages the rear side of the cartridge 24 and retains the cartridge 24 in the cartridge slot 202. Also, at this time, the sliding projection 218 is held in this position by a retainer (not shown).

Subsequently, with the moving stop 22 engaging the cartridge 24, a push on the cartridge 24 away from the open front 204 causes the retainer to release the sliding projection 218. This causes the sliding projection 218 to move the moving stop 222 to within the magazine second side 194. Additionally, because sliding projection 218 is biased towards the open front 204, the sliding projection 218 moves the cartridge 24 slightly from the cartridge slot 202. In this position, the cartridge 24 is ready to be moved from the cartridge magazine 22.

Stated another way, with this type of latch, as the cartridge 24 is inserted in one of the cartridge slots 202, the cartridge latch 212 is moving toward an engaged position to retain that cartridge 24 in the cartridge slot 202. Subsequently, after the cartridge latch 212 is engaged, pushing on the cartridge 24 causes the cartridge latch 212 to move to a disengaged position and push the cartridge 24 partly from the cartridge slot 202 of the cartridge magazine 22. This feature allows the cartridge handling mechanism 16 to individually push on each cartridge 24 in the cartridge slot 202 to release the cartridge latch 212. Subsequently, the cartridge latch 212 moves the cartridge 24 partly from the cartridge slot 202 so that the cartridge handling mechanism 16 can grab the cartridge 24. Further, this feature also allows the cartridge handling mechanism 16 to lock each cartridge 24 in one of the cartridge slots 202 during placement of the cartridge 24 within the cartridge magazine 22.

OPERATION

The loading of cartridges 24 into the tape library 10 can probably best be understood with initial reference to FIGS. 1–3. Initially, a plurality of cartridges 24 are inserted into the cartridge magazine 22. As the cartridges 24 are inserted, the cartridge latches 212 move towards the engaged position to retain the cartridges 24 within the cartridge magazine 22. Next, the cartridge magazine 22 is inserted into one of the magazine ports 118 of the load port 20 of the tape library 10. After the cartridge magazine 22 is inserted into the load port 20, the magazine handle 170 of the cartridge magazine 22 is rotated into the magazine port 118. Next, the latch handle 188 of the magazine latch 166 is moved so that the catches 168, 172 lock the cartridge magazine 22 in the load port 20.

With the cartridge magazine 22 in the load port 20, the inner assembly 116 and the cartridge magazine 22 are rotated relative to the frame assembly 68 and the outer assembly 114. After a 180 degree rotation of the inner assembly 116, the cylinder assembly 70 is slid towards the cartridge handling mechanism 16 within the frame assembly 68. Next, the locking mechanism 90 is engaged to inhibit relative movement between the cylinder assembly 70 and frame assembly 68. Importantly, the interaction between the guide projection 110 and the guide channel 164 inhibits relative rotation between the inner assembly 116 and frame assembly 68 at this location.

At this time the cartridges 24 are ready for removal by the cartridge handling mechanism 16. In particular, handler mover 48 moves the gripper assembly 50 until the gripper assembly 50 is near the desired cartridge 24 in the cartridge magazine 22. Next, the extension access assembly 52 moves the gripper assembly 50 forward so that the gripper assembly 50 contacts the desired cartridge 24 in the cartridge magazine 22 and releases the cartridge latch 212. The cartridge latch 212 then pushes the cartridge 24 partly from the cartridge slot 202. Next, the gripper assembly 50 is moved to grip the cartridge 24 from the cartridge magazine 22. The cartridge handling mechanism 16 can then move the cartridge 24 to one of the cartridge readers 18 or one of the storage bins 14. This process can be repeated until all of the cartridges 24 are individually removed from the cartridge magazine 22.

To remove cartridges 24 from the tape library 10, the cartridge handling mechanism 16 is used to place the cartridges 24 within the cartridge slots 202 in the cartridge magazines 22. The cartridge latch 212 provided herein allows the cartridge handling mechanism 16 to lock the cartridges 24 in the cartridge slots 202 during insertion into the cartridge slots 202. After the cartridges 24 are individually placed in the cartridge magazine 22 by the cartridge handling mechanism 16, the locking mechanism 90 is released and the cylinder assembly 70 is slid relative to the frame assembly 68 away from the cartridge handling mechanism 16. Next, the inner assembly 116 is rotated relative to the outer assembly 114. Upon completion of rotation, the magazine latch 166 is released and the cartridge magazine 22 and the cartridges 24 are removed from the load port 20.

Importantly, the cartridge magazine 22 provided herein allows for a plurality of cartridges 24 to be simultaneously added to the tape library 10 without interrupting the operation of the tape library 10. Further, the cartridge magazine 22 provides temporary or permanent storage for a set of cartridges 24 containing a particular data set.

While the particular cartridge magazine 22 and tape library 10 as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A tape library adapted for use with a plurality of cartridges, the tape library comprising:
   a library housing defining a library cavity;
   a cartridge magazine that is adapted to selectively retain at least two cartridges simultaneously;
   a load port which extends through the library housing into the library cavity, the load port including (i) a frame assembly, and (ii) a cylinder assembly which retains the cartridge magazine, at least a portion of the cylinder assembly and the cartridge magazine being adapted to move relative to the frame assembly; and
   a cartridge handling mechanism positioned within the library cavity, the cartridge handling mechanism being adapted to move each cartridge from the cartridge magazine into the library cavity.

2. The tape library of claim 1 wherein at least a portion of the cylinder assembly and the cartridge magazine is adapted to slide relative to the frame assembly.

3. The tape library of claim 1 wherein at least a portion of the cylinder assembly and the cartridge magazine is adapted to rotate relative to the frame assembly.

4. A method for adding a plurality of cartridges to a tape library, the method comprising the steps of:
providing a library housing defining a library cavity;
providing a load port which extends through the library housing into the library cavity;
inserting a cartridge magazine into the load port, the cartridge magazine retaining at least two cartridges simultaneously; and
rotating the cartridge magazine in the load port.

5. A tape library adapted for use with a plurality of cartridges, the tape library comprising:
a library housing defining a library cavity;
a load port which extends through the library housing into the library cavity, the load port includes (i) a frame assembly and (ii) a cylinder assembly; and
a cartridge magazine which is sized and shaped to selectively fit within the load port, the cartridge magazine being accessible through the load port from outside the library cavity while the cartridge magazine is positioned within the library cavity, the cartridge magazine being adapted to selectively retain at least two cartridges simultaneously;
wherein the cylinder assembly retains the cartridge magazine, and wherein at least a portion of the cylinder assembly and the cartridge magazine are adapted to rotate relative to the frame assembly.

6. A tape library adapted for use with a plurality of cartridges, the tape library comprising:
a library housing defining a library cavity;
a load port which extends through the library housing into the library cavity, the load port including (i) a frame assembly and (ii) a cylinder assembly;
a cartridge magazine which is sized and shaped to selectively fit within the load port, the cartridge magazine being adapted to selectively retain at least two cartridges simultaneously;
a storage bin that holds one or more of the cartridges, the storage bin being positioned within the library cavity; and
a cartridge handling mechanism positioned within the library cavity, the cartridge handling mechanism being adapted to access one of the cartridges from the storage bin while the cartridge magazine is accessible through the load port from outside the library cavity;
wherein the cylinder assembly retaining the cartridge magazine, and at least a portion of the cylinder assembly and the cartridge magazine are adapted to move relative to the frame assembly.

7. The tape library of claim 6 wherein at least a portion of the cylinder assembly and the cartridge magazine is adapted to slide relative to the frame assembly.

8. The tape library of claim 6 wherein at least a portion of the cylinder assembly and the cartridge magazine is adapted to rotate relative to the frame assembly.

9. A tape library adapted for use with a plurality of cartridges, the tape library comprising:
a library housing defining a library cavity;
a load port which extends through the library housing into the library cavity;
a cartridge magazine which is sized and shaped to selectively fit within the load port, the cartridge magazine including a cartridge latch for securing at least one of the cartridges in the cartridge magazine, the cartridge magazine being adapted to selectively retain at least two cartridges simultaneously;
a storage bin that holds one or more of the cartridges, the storage bin being positioned within the library cavity; and
a cartridge handling mechanism positioned within the library cavity, the cartridge handling mechanism being adapted to access one of the cartridges from the storage bin while the cartridge magazine is accessible through the load port from outside the library cavity, the cartridge handling mechanism being adapted to move the cartridge latch from an engaged position to a disengaged position.

10. A method for adding a plurality of cartridges to a tape library, the method comprising the steps of:
providing a library housing defining a library cavity;
providing a load port which extends through the library housing into the library cavity;
inserting a cartridge magazine into the load port, the cartridge magazine being accessible through the load port from outside the library cavity while the cartridge magazine is positioned within the library cavity, the cartridge magazine retaining at least two cartridges simultaneously; and
rotating the cartridge magazine in the load port.

11. A tape library adapted for use with a plurality of cartridges, the tape library comprising:
a library housing defining a library cavity;
a load port which extends through the library housing into the library cavity, the load port including an inner assembly and an outer assembly, the inner assembly being adapted to rotate relative to the outer assembly; and
a cartridge magazine that fits within the load port, the cartridge magazine being removable from the library housing through the load port without interruption of operation of the tape library, the cartridge magazine having a plurality of slots, each slot being adapted to retain one cartridge;
wherein the inner assembly secures the cartridge magazine when the cartridge magazine is in the load port.

12. The tape library of claim 11 wherein the cartridge magazine is accessible through the load port from outside the library cavity while the cartridge magazine is positioned within the library cavity.

13. The tape library of claim 11 including a storage bin that holds one or more of the cartridges, the storage bin being positioned within the library cavity.

14. The tape library of claim 13 including a cartridge handling mechanism positioned within the library cavity, the cartridge handling mechanism being adapted to access one of the cartridges from the storage bin while the cartridge magazine is accessible through the load port from outside the library cavity.

15. The tape library of claim 11 including at least two cartridge magazines which are sized and shaped to selectively fit within the load port simultaneously, each cartridge magazine being adapted to selectively retain at least two cartridges simultaneously.

16. The tape library of claim 11 wherein the cartridge magazine is accessible while within the load port without interruption in the movement of cartridges within the library cavity.

17. A tape library adapted for use with a plurality of cartridges, the tape library comprising:
   a library housing defining a library cavity, the library housing including a housing side;
   a load port which extends through the housing side into the library cavity, the load port having a library opening that is smaller than the housing side, the load port includes an inner assembly and an outer assembly, the inner assembly being adapted to rotate relative to the outer assembly; and
   a cartridge magazine that removably fits within the load port, the cartridge magazine having a plurality of slots, each slot being adapted to retain one cartridge;
   wherein the inner assembly secures the cartridge magazine when the cartridge magazine is in the load port.

18. A tape library adapted for use with a plurality of cartridges, the tape library comprising:
   a library housing defining a library cavity;
   a load port that extends through the library housing, the load port including an inner assembly and an outer assembly, the inner assembly being adapted to move relative to the outer assembly; and
   a cartridge magazine that is selectively secured to the inner assembly, the cartridge magazine being adapted to retain a plurality of cartridges.

19. The tape library of claim 18 wherein at least a portion of the inner assembly is adapted to rotate relative to the outer assembly.

20. The tape library of claim 18 wherein the cartridge magazine is accessible through the load port from outside the library cavity while the cartridge magazine is positioned within the library cavity.

21. The tape library of claim 18 wherein the cartridge magazine includes a cartridge latch for securing at least one of the cartridges in the cartridge magazine.

22. The tape library of claim 21 including a storage bin that holds one or more of the cartridges, the storage bin being positioned within the library cavity.

23. The tape library of claim 22 including a cartridge handling mechanism positioned within the library cavity, the cartridge handling mechanism being adapted to access one of the cartridges from the storage bin while the cartridge magazine is accessible through the load port from outside the library cavity.

24. The tape library of claim 23 wherein the cartridge handling mechanism is adapted to move the cartridge latch from an engaged position to a disengaged position.

25. The tape library of claim 18 including at least two cartridge magazines which are sized and shaped to selectively fit within the load port simultaneously, each cartridge magazine being adapted to selectively retain at least two cartridges simultaneously.

26. The tape library of claim 18 wherein the cartridge magazine is accessible while within the load port without interruption in the movement of cartridges within the library cavity.

27. The tape library of claim 18 including a magazine latch for selectively latching the cartridge magazine in the load port.

28. The tape library of claim 18 wherein at least a portion of the inner assembly is adapted to slide relative to the outer assembly.

29. The tape library of claim 18 wherein the library housing includes a housing side, and wherein the load port extends through the housing side into the library cavity, the load port having a library opening that is smaller than the housing side.

30. The tape library of claim 18 wherein the cartridge magazine is adapted to selectively retain at least six cartridges simultaneously.

31. The tape library of claim 18 wherein the cartridge magazine includes at least two cartridge slots, each cartridge slot being sized and shaped to retain one of the cartridges.

32. A method for adding a plurality of cartridges to a tape library, the method comprising the steps of:
   providing a library housing that defines a library cavity;
   providing a load port that extends through the library housing;
   inserting a cartridge magazine into the load port, the cartridge magazine retaining at least two cartridges simultaneously; and
   rotating the cartridge magazine in the load port.

33. The method of claim 32 further comprising the step of providing a storage bin that holds one or more of the cartridges, the storage bin being positioned within the library cavity.

34. The method of claim 33 further comprising the step of accessing one of the cartridges from the storage bin with a cartridge handling mechanism.

35. The method of claim 34 wherein the step of accessing one of the cartridges with the cartridge handling mechanism occurs substantially simultaneously with the step of inserting a cartridge magazine into the load port.

36. The method of claim 32 including the step of inserting a second cartridge magazine into the load port, the second cartridge magazine selectively retaining at least two cartridges simultaneously.

37. The method of claim 32 including the steps of locking at least one of the cartridges in the cartridge magazine with a cartridge latch, and releasing the cartridge latch with a cartridge handling mechanism positioned within the tape library.

38. The method of claim 37 including the step of removing the at least one cartridge from the cartridge magazine with the cartridge handling mechanism.

39. A method for adding a plurality of cartridges to a tape library, the method comprising the steps of:
   providing a library housing;
   providing a load port that extends through the library housing, the load port including an inner assembly and an outer assembly, the inner assembly being adapted to move relative to the outer assembly; and
   securing a cartridge magazine to the inner assembly, the cartridge magazine retaining at least two cartridges simultaneously.

40. The method of claim 39 including the step of inserting a second cartridge magazine into the load port, the second cartridge magazine selectively retaining at least two cartridges simultaneously.

41. The method of claim 39 wherein the step of providing a load port includes rotating the inner assembly relative to the outer assembly.

42. The method of claim 39 including the steps of locking at least one of the cartridges in the cartridge magazine with a cartridge latch, and releasing the cartridge latch with a cartridge handling mechanism positioned within the tape library.

43. A method for adding a plurality of cartridges to a tape library, the method comprising the steps of:
   providing a library housing defining a library cavity;
   providing a load port which extends through the library housing;
   inserting a cartridge magazine into the load port, the cartridge magazine retaining at least two cartridges simultaneously;

locking at least one of the cartridges in the cartridge magazine with a cartridge latch; and releasing the cartridge latch with a cartridge handling mechanism positioned within the tape library.

44. The method of claim 43 including the step of removing the at least one cartridge from the cartridge magazine with the cartridge handling mechanism.

45. A tape library adapted for use with a plurality of cartridges, the tape library comprising:

a library housing defining a library cavity;

a load port which extends through the library housing;

a cartridge magazine positioned near the load port, the cartridge magazine including a cartridge latch that secures at least one of the cartridges within the cartridge magazine; and a cartridge handling mechanism positioned within the library cavity, the cartridge handling mechanism moving the cartridge latch from an engaged position to a disengaged position.

46. A tape library adapted for use with a plurality of cartridges, the tape library comprising:

a library housing defining a library cavity;

a load port which extends through the library housing into the library cavity;

a cartridge magazine that fits within the load port, the cartridge magazine being removable from the library housing through the load port without interruption of operation of the tape library, the cartridge magazine having a plurality of slots, each slot being adapted to retain one cartridge; and a cartridge handler that moves a cartridge between the slots, the cartridge handler rotating to access cartridges that are positioned facing opposing directions within the library cavity.

47. A tape library adapted for use with a plurality of cartridges, the tape library comprising:

a library housing defining a library cavity, the library housing including a housing side;

a load port which extends through the housing side into the library cavity, the load port having a library opening that is smaller than the housing side;

a cartridge magazine that removably fits within the load port, the cartridge magazine having a plurality of slots, each slot being adapted to retain one cartridge; and a cartridge handler that moves a cartridge between the slots, the cartridge handler rotating to access cartridges that are positioned facing opposing directions within the library cavity.

48. A tape library for use with a plurality of cartridges, the tape library comprising:

a library housing defining a library cavity;

a load port which extends through the library housing into the library cavity; and a cartridge magazine that removably fits within the load port, the cartridge magazine including a plurality of slots that each holds one cartridge, the cartridge magazine having an axis that extends through at least a portion of the cartridge magazine, the cartridge magazine rotating about the axis while the cartridge magazine is positioned within the load port.

49. The tape library of claim 48 wherein the load port includes an inner assembly and an outer assembly, the inner assembly securing the cartridge magazine when the cartridge magazine is in the load port, the inner assembly being adapted to rotate relative to the outer assembly.

50. The tape library of claim 48 wherein the cartridge magazine is accessible while within the load port without interruption in the movement of cartridges within the library cavity.

51. The tape library of claim 48 further comprising a fixed storage bin that retains a plurality of cartridges, and a cartridge handler that selectively moves a cartridge from the cartridge magazine to the fixed storage bin.

52. The tape library of claim 51 wherein the cartridge handler rotates to access cartridges that are positioned facing opposing directions within the library cavity.

53. The tape library of claim 48 wherein the library housing includes a housing side, and wherein the load port extends through the housing side into the library cavity, the load port having a library opening that is smaller than the housing side.

54. The tape library of claim 48 including at least two cartridge magazines which are sized and shaped to selectively fit within the load port simultaneously, each cartridge magazine selectively retaining at least two cartridges simultaneously.

55. The tape library of claim 48 wherein the cartridge magazine includes a cartridge latch for securing at least one of the cartridges in the cartridge magazine.

56. The tape library of claim 55 further comprising a cartridge handling mechanism positioned within the library cavity, the cartridge handling mechanism moving the cartridge latch from an engaged position to a disengaged position.

57. A tape library for use with a plurality of cartridges, the tape library comprising:

a library housing defining a library cavity;

a load port which extends through the library housing into the library cavity, the load port including an inner assembly and an outer assembly, the inner assembly rotating relative to the outer assembly while the inner assembly is positioned substantially entirely within the outer assembly; and a cartridge magazine removably fits within the load port, the cartridge magazine retaining a plurality of the cartridges.

58. The tape library of claim 57 wherein the cartridge magazine is accessible through the load port from outside the library cavity while the cartridge magazine is positioned within the library cavity.

59. The tape library of claim 57 wherein the cartridge magazine includes a cartridge latch for securing at least one of the cartridges in the cartridge magazine.

60. The tape library of claim 57 including a storage bin that holds one or more of the cartridges, the storage bin being positioned within the library cavity.

61. The tape library of claim 60 including a cartridge handling mechanism positioned within the library cavity, the cartridge handling mechanism being adapted to access one of the cartridges from the storage bin while the cartridge magazine is accessible through the load port from outside the library cavity.

62. The tape library of claim 61 wherein the cartridge handling mechanism is adapted to move the cartridge latch from an engaged position to a disengaged position.

63. The tape library of claim 57 including at least two cartridge magazines which are sized and shaped to selectively fit within the load port simultaneously, each cartridge magazine being adapted to selectively retain at least two cartridges simultaneously.

64. The tape library of claim 57 wherein the cartridge magazine is accessible while within the load port without interruption in the movement of cartridges within the library cavity.

65. The tape library of claim 57 including a magazine latch for selectively latching the cartridge magazine in the load port.

66. The tape library of claim 57 wherein the library housing includes a housing side, and wherein the load port extends through the housing side into the library cavity, the load port having a library opening that is smaller than the housing side.

67. A tape library for use with a plurality of cartridges, the tape library comprising:

a library housing defining a library cavity;

a load port which extends through the library housing into the library cavity;

a cartridge magazine that removably fits within the load port, the cartridge magazine including a plurality of slots that each holds one cartridge; and a cartridge handling mechanism positioned within the library cavity, the cartridge handling mechanism repositioning a cartridge within the library cavity simultaneously with the cartridge magazine being removed from the load port, the cartridge handling mechanism rotating to access cartridges that are positioned facing opposing directions within the library cavity.

68. A tape library for use with a plurality of cartridges, the tape library comprising:

a library housing defining a library cavity;

a load port which extends through the library housing into the library cavity; the load port including an inner assembly and an outer assembly, the inner assembly rotating relative to the outer assembly;

a cartridge magazine that removably fits within the load port, the cartridge magazine including a plurality of slots that each holds one cartridge; and a cartridge handling mechanism positioned within the library cavity, the cartridge handling mechanism repositioning a cartridge within the library cavity simultaneously with the cartridge magazine being removed from the load port;

wherein the inner assembly secures the cartridge magazine when the cartridge magazine is in the load port.

69. A tape library for use with a plurality of cartridges, the tape library comprising:

a library housing defining a library cavity;

a load port which extends through the library housing into the library cavity;

a cartridge magazine that removably fits within the load port, the cartridge magazine including a plurality of slots that each holds one cartridge, the cartridge magazine having an axis that extends through at least a portion of the cartridge magazine, the cartridge magazine rotating about the axis while the cartridge. magazine is positioned within the load port; and a cartridge handling mechanism positioned within the library cavity, the cartridge handling mechanism repositioning a cartridge within the library cavity simultaneously with the cartridge magazine being removed from the load port.

* * * * *